United States Patent [19]

Roderburg

[11] Patent Number: 4,554,179

[45] Date of Patent: Nov. 19, 1985

[54] METHOD FOR THE COLOR CODING OF OPTICAL FIBERS

[75] Inventor: Harald Roderburg, Langenhagen, Fed. Rep. of Germany

[73] Assignee: Gesellschaft mit beschränkter Haftung Kabelmetal Electro, Hanover, Fed. Rep. of Germany

[21] Appl. No.: 625,867

[22] Filed: Jun. 28, 1984

[30] Foreign Application Priority Data

Jun. 30, 1983 [DE] Fed. Rep. of Germany ....... 3323547
Mar. 1, 1984 [DE] Fed. Rep. of Germany ....... 3407520

[51] Int. Cl.⁴ .......................... B05D 1/02; G02B 5/14
[52] U.S. Cl. .................................... 427/163; 427/175; 427/177; 427/178; 427/261; 427/424

[58] Field of Search ............... 427/163, 175, 177, 178, 427/424, 261

[56] References Cited

U.S. PATENT DOCUMENTS 4,482,584 11/1984 Hess et al. ....................... 427/424 X Primary Examiner—James R. Hoffman
Attorney, Agent, or Firm—Martin A. Farber

[57] ABSTRACT

A method and apparatus are disclosed for the color coding of optical fibers (1). The optical fibers (1) are drawn through color chambers (6) in which they are continuously colored. Thereafter they are provided with distinctly colored ring-shaped markings by means of swinging color jets. After passage through a drying path (7), the optical fibers (1) are wound onto take-up reels (13).

8 Claims, 5 Drawing Figures

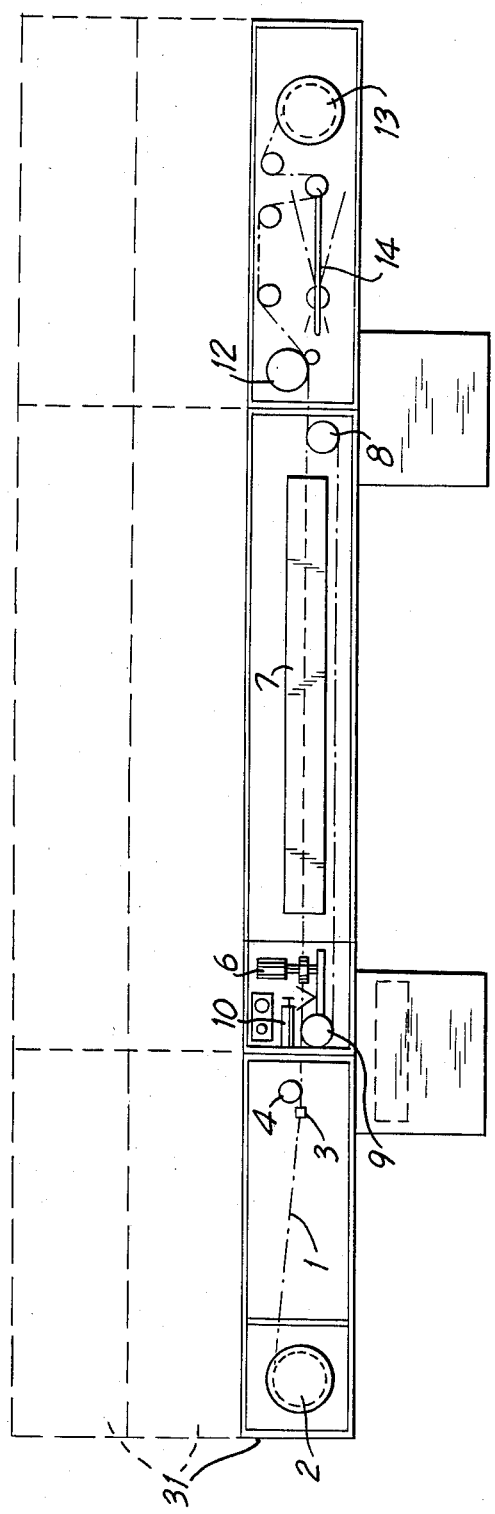
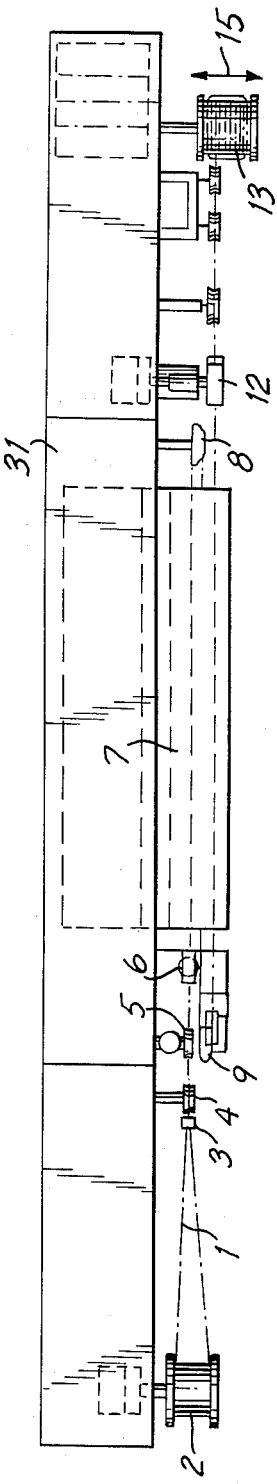
FIG. 1
FIG. 2

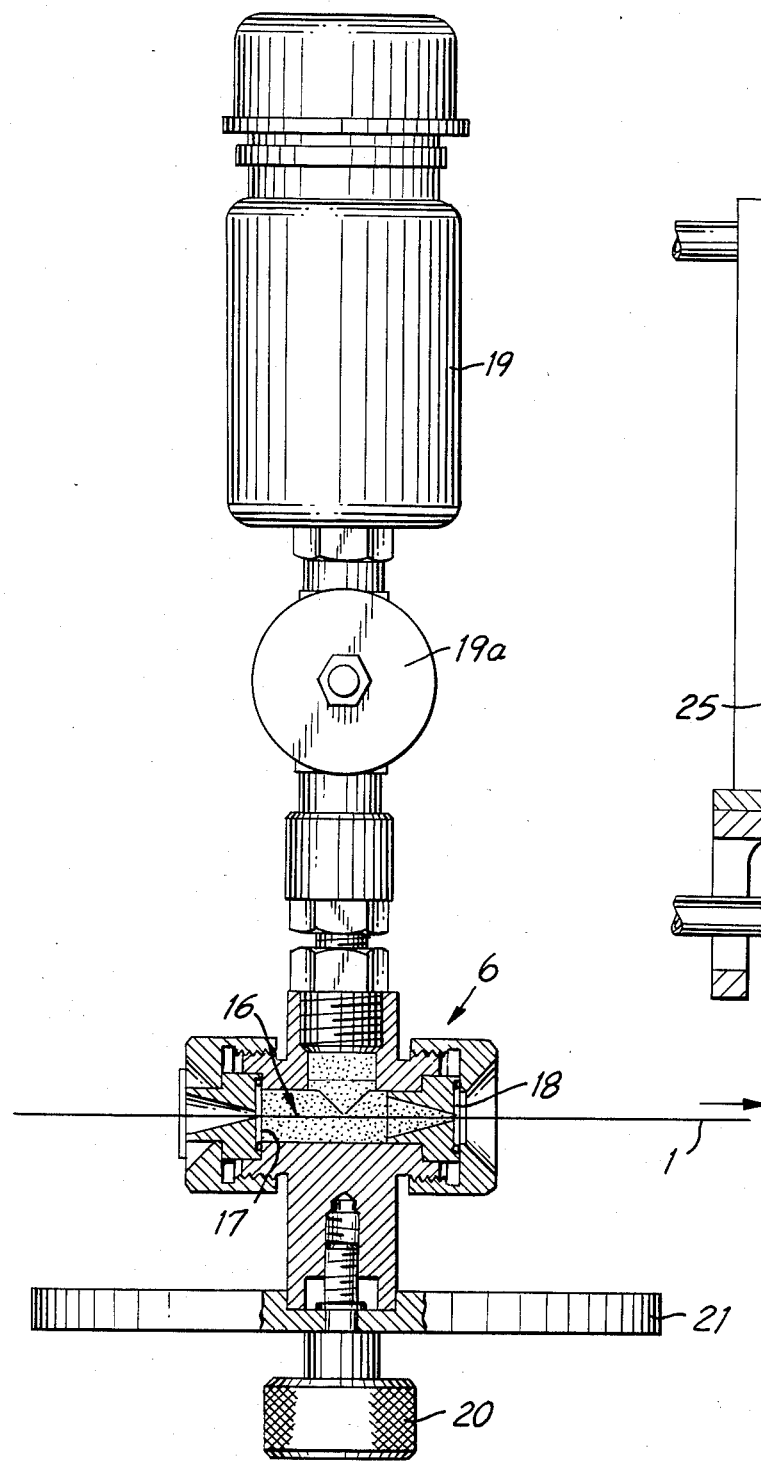
FIG. 4
FIG. 3
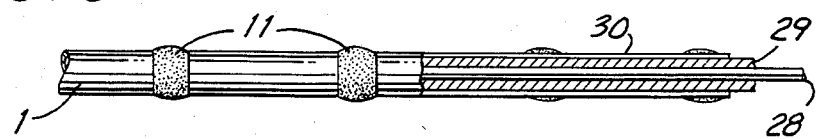
FIG. 5

METHOD FOR THE COLOR CODING OF OPTICAL FIBERS

BACKGROUND OF THE INVENTION

Field of the Invention

The invention relates to a method for the color coding of at least one optical fiber which is arranged together with at least one other optical fiber in the core of a cable in general or a communications cable in particular.

Communication cables with optical fibers—referred to hereinafter as "optical fiber cables"—are cables which consist of a plurality of optical fibers of glass or plastic. The optical fibers are arranged in the core of such an optical fiber cable which is surrounded by an external protective jacket. Optical fibers are used, for example, in communications engineering as a substitute for the metal wires previously customary. As compared with metal wires, optical fibers have a number of advantages. They have a great frequency range (band width) and a low attenuation so that more transmission channels can be transmitted with increased distance between amplifiers or repeaters over an optical fiber than over a copper wire. They can readily be bent and have a very small diameter so that the cross section of the cable can be reduced. Furthermore, they are not influenced by external electric or magnetic fields.

In the same way as the traditional cores of communication cables provided with metallic wires, optical fibers must be coded so that simple, dependable identification of the individual optical fibers is possible for splicing. This requirement must, in particular, be satisfied when a large number of optical fibers are arranged in the core of a cable.

The object of the present invention is to provide a method by which at least one optical fiber can be so coded in a single operation that it can be readily identified among a large number of optical fibers.

SUMMARY OF THE INVENTION

In accordance with the invention, a method of the afore-mentioned type provides:

first pulling off the optical fiber (1) from a pay-off reel (2) by means of a pull-off means and then pulling the optical fiber (1) through a color chamber (6) for continuous coloring of its surface;

thereupon, spraying ring-shaped markings (11) which are limited in axial direction and consist of a color which is clearly distinct from the color of the color chamber (6) onto the colored surface of the optical fiber (1) by means of jets of color which emerge under pressure from nozzles (23) which swing continuously around an axis of swing;

thereupon conducting the optical fiber (1) through a drying path (7); and then winding the optical fiber (1) up on a take-up reel (13).

By this method an optical fiber can be coded individually in continuous passage in a single operation. Any desired color can be contained in the color chamber so that by suitable change of color any desired number of differently continuously colored optical fibers can be obtained. This different number can be doubled, that is the number of combinations can be doubled, by applying or not applying the ring-shaped markings to some of the optical fibers which are combined in the core of an optical fiber cable, which can be done as an option.

Also by the invention the continuously colored optical fiber (1) is conducted through a drying path (7) prior to the application of the markings.

The ring-shaped markings can, in principle, be applied to the surface of the colored optical fiber while it is still wet. However, it has been found that it is more favorable for the transmission loss of the optical fiber if the markings are applied only after their colored surface has been dried. In order to dry the continuously colored surface of the optical fiber and the markings the same drying path may suitably be used, it being passed through several times by the optical fiber by means of guide wheels.

In this respect, the optical fiber (1), after leaving the color chamber (6) and after the application of the markings (11), is guided by guide wheels (8, 9) in each case through the same drying path (7).

The swing system is regulated as a function of the pull-off speed of the optical fiber. In this way always a constant axial distance of the markings from each other is assured.

Furthermore, in accordance with the invention there is used for the markings (11) a mechanical swing system (10) which is driven by a DC motor, controlled in dependency on the speed of the pull off, thus on the optical fiber withdrawal speed.

Furthermore, the optical fiber (1) is pulled in front of the color chamber (6) through a cleaning nozzle (3).

Still further a drum capstan (12) which can be driven with variable speed is used as the pull off.

Also by the invention the take-up reel (13) is driven with a speed which is controlled in dependency on the tensile stress exerted on the optical fiber (1).

The invention also provides an apparatus for carrying out the method, characterized in the manner that the optical fiber (1) is so wound onto the take-up reel (13) as to result in a wound package of trapezoidal shape as seen in cross section.

Furthermore, the pay-off reel (2), color chamber (6), swing system (10), drying path (7), capstan (12) and take-up reel (13) are arranged on a common frame (31).

Further, three complete frames (31) are arranged in each unit for the simultaneous coding of three optical fibers (1).

Furthermore, in accordance with the invention the drying path (7) is provided through a drying oven with a stream of hot air.

With the above and other objectives in view, the present invention will be described in connection with a preferred embodiment illustrated in the accompanying drawings as follows.

BRIEF DESCRIPTION OF THE DRAWINGS

FIG. 1 is a side view of an apparatus for carrying out the method of the invention;

FIG. 2 is a top view of the apparatus;

FIG. 3 shows the color chamber, partially in section, on a larger scale;

FIG. 4 shows the swing system, also partially in section and on a larger scale; and FIG. 5 shows a coded optical fiber on an even larger scale.

DETAILED DESCRIPTION OF THE PREFERRED EMBODIMENT

An optical fiber to be coded is wound onto a pay-off reel (2) from which it is withdrawn in order to be passed through the following device. For this purpose it is first of all pulled through a guide nipple 3 and via a guide roller 4 through a cleaning nozzle 5 and then enters into a color chamber 6 which is shown more fully in FIG. 3. In the color chamber 6 the optical fiber 1 is continuously colored. From the color chamber 6 the colored optical fiber 1 is pulled through a drying path 7 and conducted via guide rollers 8 and 9 to a swing system 10 with which ring-shaped markings 11 (FIG. 5) which are limited in axial direction are sprayed onto the optical fiber 1. The swing system 10 is shown in further detail in FIG. 4.

After the ring-shaped markings 11 have been applied, the optical fiber 1 is again conducted through the drying path 7, which preferably operates with hot air. The optical fiber 1, which is dry on its surface, then passes to a drum capstan 12 which serves, as a whole, as pull off for the optical fiber 1. Instead of the drum capstan 12 any other known pull off could, to be sure, also be used, such as, for instance, a caterpillar pull off. The drum capstan 12 takes up only a small amount of space. It is driven by a variable-speed electric motor.

In the embodiment shown the optical fiber 1 of the invention is pulled, after the coloring and after the marking, through the drying path 7. In principle the markings 11, however, can also be applied before the first passage through the drying path 7, which then need only be passed through once. It is also possible to arrange the swing system 10 at the point where the drum capstan 12 is located and to arrange the drum capstan on that side of the drying path 7 on which the color chamber 6 is located. In principle, two separate drying paths can also be used. Furthermore, in the case of the embodiment shown, it is also possible to pass the optical fiber 1 between the guide wheels 8 and 9 either through the drying path 7 or outside of it.

The drying path 7 is preferably heated with hot air. It is maintained at a constant temperature of at most 110° C.

The cleaning nozzle 3 which is arranged in front of the color chamber 6 is operated, for instance, with compressed air, by which impurities on the surface of the optical fiber 1 are removed.

Behind the drum capstan 12, the optical fiber 1 is wound onto a take-up reel 13 which is driven by a speed-controlled electric motor. This speed is controlled as a function of the tensile stress acting on the optical fiber 1, which stress is detected by means of a dancer 14. The tensile stress must not be too high so that the optical fiber 1 is not excessively stretched. However, it must also not be too low since then dependable winding-up is not possible.

In order that the optical fiber 1 not be damaged by the winding-up, it can preferably be so wound-up onto the take-up reel 13 as to result in a wound package of trapezoidal shape in cross section. For this purpose the take-up reel 13 is displaceable in the direction indicated by the double arrow 15 in accordance with a predetermined program during the winding-up.

The color chamber 6 is shown on a larger scale in FIG. 3. It comprises a color space 16 which is completely filled with color material (e.g. liquid) and through which the optical fiber 1 is drawn. On both sides, the color chamber is provided with seals or packings 17, 18 respectively having holes through them which are so dimensioned that the optical fiber 1 can just pass through them without excessive friction. These seals or packings 17, 18 consist, for instance, of teflon. They have a bore which is minimally larger than the diameter of the optical fiber. They may also consist of felt or other material. Above the color space 16 there is a storage container 19 for the color material which provides assurance that sufficient color will always be present in the color space 16. A valve 19a is provided in the channel between the color space 16 and the storage container 19. The color chamber 6 can be fastened to a support 21 by means of a screw 20.

In FIG. 4 the swing system 10 for the application of the ring-shaped markings 11 onto the surface of the optical fiber 1 comprises a mechanically excited oscillator 22 and a nozzle 23 from the end of which a jet of color emerges. The end of the nozzle 23 swings with adjustable frequency in the direction indicated by the double-ended arrow 24, thereby producing the axially limited ring-shaped markings 11 on the surface of the optical fiber 1, which is moved perpendicular to the plane of the drawing. It is sufficient if the jet of color strikes against the optical fiber 1 only from one side, since the dimensions of the optical fiber are so small that the color runs together around the optical fiber to form a ring. The oscillator 22 is preferably driven by a DC motor whose speed of rotation is controlled in accordance with the rotational speed of the drum capstan 12 whereby also the frequency of swing of the nozzle 23 is regulated. Below the nozzle 23 and under the optical fiber 1 there is arranged a collection chamber 25 having a screen 26, in which chamber the excess color is collected and returned via a pipe 27 to the color container.

The method of the invention operates for instance as follows:

The optical fiber 1 passes through the stations shown in FIGS. 1 and 2 in accordance with the description given above. It is drawn-off with the speed adjusted or set on the drum capstan 12. This speed is adjusted in accordance with the manufacturing parameters. It can be changed during the process. The frequency of swing of the nozzle 23 is adjusted as a function of the speed of rotation of the drum capstan and thus as a function of the speed of withdrawal of the optical fiber 1; it is also so adjusted that it is assured that the ring-shaped markings 11 are at a constant axial distance from each other.

The optical fiber 1 comprises, as shown in FIG. 5, the fiber 28 itself which actually conducts the optical signal and is covered with a protective layer 29. In the color chamber 6 a layer 30 of color is continuously applied to said protective layer, whereupon, by means of the swing system 10, the markings 11 are applied to it.

The color which is used for the markings 11 should also clearly differ and stand out from the colors which are used for the continuous coloring of the optical fiber 1 with the color layer 30. The markings 11 are preferably made in black.

Pay-off reel 2, color chamber 6, swing system 10, drum capstan 12 and take-up reel 13 are arranged, in the preferred embodiment of the invention, on a common frame 31. The apparatus is thus of compact construction requiring relatively little space. It is furthermore possible to typically combine three frames 31 into a compact unit, as shown in FIG. 1, although not limited thereto.

If a sufficient number of different colors for a large number of optical fibers 1 to be contained within an optical fiber cable is not available, optical fibers without markings 11 can also be used by way of further differentiation. In this case also the method of the invention can be used. In that case, the swing system 10 is merely not employed.

I claim:

1. A method for the color coding of at least one optical fiber which is arranged together with at least one other optical fiber in the core of a cable, comprising the steps of first pulling off the optical fiber from a pay-off reel by a pull-off means and then pulling the optical fiber through a color chamber containing color for continuous coloring of the surface of the optical fiber, thereupon, selectively spraying ring-shaped markings which are limited in axial direction onto the colored surface of the optical fiber by jets of another color which emerge under pressure from a nozzle swinging continuously around a pivot axis, the markings comprising said another color which is clearly distinct from the color in the color chamber, thereupon conducting the optical fiber through a drying path, and then winding the optical fiber up on a take-up reel.

2. The method as set forth in claim 1, wherein the continuously colored optical fiber is conducted through the drying path prior to applying the markings.

3. The method as set forth in claim 1, further comprising the step of guiding the optical fiber, after leaving the color chamber and after applying the markings, by guide wheels respectively through the same drying path.

4. The method as set forth in claim 1, further comprising the step of using for the markings a mechanical swing system for the nozzle which is driven by a DC motor, controlled in dependency on the speed of the pull-off means.

5. The method as set forth in claim 1, further comprising the step of pulling the optical fiber through a cleaning nozzle in front of the color chamber.

6. The method as set forth in claim 1, further comprising the step of using for the pull-off means a drum capstan which is drivable with variable speed.

7. The method as set forth in claim 1, further comprising the step of driving the take-up reel with a speed which is controlled in dependency on tensile stress exerted on the optical fiber.

8. The method as set forth in claim 1, further comprising the step of winding the optical fiber onto the take-up reel so as to result in a wound package of trapezoidal shape in cross section.

* * * * *